Patented Aug. 14, 1945

2,382,780

UNITED STATES PATENT OFFICE 2,382,780

METHOD OF PROCESSING FOODS

John C. Donnelly, Greenwich, Conn., assignor to Maguire Industries, Incorporated, a corporation of New York No Drawing. Application May 5, 1943, Serial No. 485,710

9 Claims. (Cl. 99—204)

My invention relates to a method of processing foods, and more particularly a method of processing dehydrated foods. The invention is especially useful in connection with dehydrated fruits and vegetables, to which use, however, it is not restricted.

One object of the invention is to provide an improved method of processing foods which will give them a reduced volume and a convenient form and size for handling, shipping and storing. A further object is the provision of such a method which will secure in the food its full flavor and which will permit substantial reconstitution of the food before use. Other objects of the invention will be apparent upon consideration of the present specification.

In my co-pending patent application, U. S. Serial No. 487,495, filed May 18, 1943, there is described a method of processing foodstuffs wherein the foodstuff is first refrigerated and then compressed while at refrigerated temperature. The result is an integrated unit of the foodstuff which requires small space for transportation and storage, wherein deterioration is delayed, and wherein valuable fats, oils, and low melting point constituents are preserved in the compressed unit.

I have now found that, after dehydration, certain foodstuffs may be advantageously compressed into an integral unit at an elevated temperature. Examples of such foodstuffs are: cranberries, cabbage flakes, apples, carrots, cauliflower, mixed vegetables, and beets, etc. Other comestibles, having a fibrous structure and being soft to the touch after dehydration, have been found to produce a block having all of the desirable qualities named above.

In order that such processed foodstuffs may be satisfactorily reconstituted before being prepared for the table, it is imperative that their structure be not damaged. To this end the critical pressure of each food must not be exceeded, and a sufficient time must elapse during application of the pressure.

In general, the dehydrated food is raised to a temperature above room temperature but below the boiling point of water. In most cases the food is heated to a temperature of the order of 150° to 165° Fahrenheit. The heated food is then compressed under a pressure below that at which its structure breaks down. This is found to be a pressure of from 1500 to 2000 pounds per square inch. The pressure is applied slowly and the full pressure is maintained during a "dwell" period of from 5 to 20 seconds. The resulting block is then removed from the press and wrapped.

Following are examples of how the method is applied:

Example 1

A quantity of cranberries was dehydrated in the usual manner and to the usual degree, that is to say: until the moisture content was reduced to from 5 per cent to 10 per cent. The dehydrated cranberries were then heated to a temperature of 150° F. A die having a cross section of four square inches was filled with the dehydrated, heated cranberries to a depth of about two and three quarter inches. A punch was then inserted slowly, into the die, until it imposed a pressure of 1500 pounds per square inch upon the cranberries therein. The punch was held in this position for a "dwell" period of thirteen seconds, and then was removed from the die. The resulting block of cranberries measured four square inches in plan and seven-sixteenths of an inch in depth, and represented a volume reduction of 84 per cent. The weight of the block was substantially one ounce. Following this, the block was wrapped in a water-resistant material.

Later the block was unwrapped, was placed in a container with two cupfuls of boiling water, and was allowed to stand there for fifteen minutes. The block was seen to disintegrate within three minutes, and the berries rehydrated independently to their original form. At the end of fifteen minutes one cup of sugar was added, the container was placed over a burner and the contents were allowed to simmer for two minutes, while being constantly stirred. The result was cranberry sauce of a consistency and flavor substantially equal to that produced from fresh cranberries.

Example 2

A quantity of cabbage flakes was dehydrated until the moisture content was reduced to from 5 percent to 6 percent. This material was heated to a temperature of about 150° F. The dehydrated, heated cabbage was then placed in a suitable die and subjected to a pressure of substantially 1750 pounds per square inch. The resulting block had a density of approximately 44 pounds per cubic foot, the volume reduction being substantially 82 per cent.

It is not necessary to heat the dehydrated comestibles to high temperatures. A temperature in the neighborhood of 150° Fahrenheit will generally suffice. Furthermore, a pressure of from 1500 to 2000 pounds per square inch has been found to be the critical range. Pressures below 1500 pounds per square inch have been found to give insufficient volume reduction for practical application of the process. Pressures above 2000 pounds per square inch tend to damage the structure of the food.

The descriptions here given, and the particular examples set forth, are presented merely to indicate how the invention may be employed. Other forms, and applications of the invention which come within the proper scope of the appended claims will readily suggest themselves to those familiar with the food processing art.

I claim:

1. A method of processing dehydrated foods having a fibrous structure comprising the steps of heating such food to between 150 and 165 degrees Fahrenheit, and compressing the heated food into a block at a pressure below 2000 pounds per square inch.

2. A method of processing dehydrated foods having a fibrous structure comprising the steps of heating such food to between 150 and 165 degrees Fahrenheit, and compressing the heated food into a block at a pressure between 1500 and 2000 pounds per square inch.

3. A method of processing foods having a fibrous structure comprising the steps of dehydrating the food, heating the dehydrated food to between 150 degrees Fahrenheit and the boiling point of water, and compressing the heated food to a compact block under a pressure of substantially 1500 pounds per square inch.

4. A method of processing foods having a fibrous structure comprising the steps of dehydrating the food, heating the food to between 150 degrees Fahrenheit and the boiling point of water, and compressing the heated food to a compact block under a pressure of between 1500 and 2000 pounds per square inch.

5. A method of processing foods having a fibrous structure comprising dehydrating the food to a moisture content of between five and ten per cent, heating the dehydrated food to between 150 and 165 degrees Fahrenheit, and compressing the heated food into a block at a pressure of between 1500 and 2000 pounds per square inch.

6. A method of processing cranberries comprising the steps of heating dehydrated cranberries to substantially 150 degrees Fahrenheit, and compressing the heated cranberries to a compact block under a pressure of substantially 1500 pounds per square inch.

7. A method of processing cranberries comprising the steps of dehydrating the cranberries, heating the cranberries to substantially 150 degrees Fahrenheit, and compressing the heated cranberries to a compact block under a pressure of substantially 1500 pounds per square inch.

8. A method of processing cranberries comprising the steps of dehydrating the cranberries to a point at which their moisture content is substantially between 5 and 10 per cent, heating the dehydrated cranberries to substantially 150 degrees Fahrenheit, compressing the loose, dehydrated, heated cranberries to a compact block under pressure of substantially 1500 pounds per square inch, maintaining said pressure during a "dwell" period of substantially 13 seconds, releasing said pressure, and wrapping the resulting block in a water-resistant material, substantially as described.

9. A method of processing food having a fibrous structure comprising the steps of dehydrating the food to a point at which its moisture content is between 5 and 10 per cent., heating the dehydrated food to between 150° and 165° Fahrenheit, compressing the dehydrated, heated food to a compact block under a pressure of between 1500 and 2000 pounds per square inch, maintaining said pressure during a "dwell" period of between 5 and 20 seconds, releasing said pressure, and wrapping the resulting block in a water-resistant material, substantially as described.

JOHN C. DONNELLY.